United States Patent [19]

Imoto et al.

[11] Patent Number: 5,334,429
[45] Date of Patent: Aug. 2, 1994

[54] LINING MATERIAL FOR PIPE LINES AND A PROCESS FOR PROVIDING PIPE LINES THEREWITH

[75] Inventors: Takayoshi Imoto, Otsu; Toshio Okahashi, Higashiosaka, both of Japan

[73] Assignee: Ashimori Industry Co., Ltd., Osaka, Japan

[21] Appl. No.: 902,731

[22] Filed: Jun. 23, 1992

[30] Foreign Application Priority Data

Jun. 24, 1991 [JP] Japan ................................. 3-182043
Apr. 4, 1992 [JP] Japan ................................. 4-112151

[51] Int. Cl.$^5$ ............................................. B29D 22/00
[52] U.S. Cl. ................................. 428/36.2; 428/36.91; 428/286; 428/290; 138/98; 138/128
[58] Field of Search ..................... 428/34.5, 34.6, 35.4, 428/35.2, 36.2, 36.91, 286, 290; 138/97, 98, 128; 156/287; 264/36, 269

[56] References Cited

U.S. PATENT DOCUMENTS

| | | | |
|---|---|---|---|
| 3,261,374 | 7/1966 | Anderson et al. | 138/97 |
| 3,996,967 | 12/1976 | Takada | 138/97 |
| 4,976,290 | 12/1990 | Gelin et al. | 138/141 |

FOREIGN PATENT DOCUMENTS

| | | | |
|---|---|---|---|
| 0228998 | 7/1987 | European Pat. Off. | |
| 0290184 | 11/1988 | European Pat. Off. | |
| 0377486 | 7/1990 | European Pat. Off. | |
| 5140595 | 11/1976 | Japan . | |
| 589371 | 2/1983 | Japan . | |
| 3-292127 | 12/1991 | Japan | B29C 63/34 |
| 2018384 | 10/1979 | United Kingdom . | |
| 2075086 | 11/1981 | United Kingdom . | |
| 2188695 | 10/1987 | United Kingdom . | |
| WO83/03131 | 9/1983 | World Int. Prop. O. | |
| WO85/05431 | 12/1985 | World Int. Prop. O. | |

OTHER PUBLICATIONS

English translation of JP, A, 3-292127.

*Primary Examiner*—George F. Lesmes
*Assistant Examiner*—Chris Raimund
*Attorney, Agent, or Firm*—Birch, Stewart, Kolasch & Birch

[57] ABSTRACT

A lining material for pipe lines, especially those buried in the ground such as sewage pipe lines, and a process for providing such pipe lines therewith, includes a flexible tubular film, a resin-impregnated sheet covering the outer surface of the flexible tubular film, and a tubular covering material having a strong resistance to tensile force. The sheet may be constructed by several units of sheet fractions which are overlapped in both lateral end portions so as to be slidable over each other in opposite directions to form a tubular sheet. The lining material is applicable for repair/and reinforcement to the inner surface of a pipe line having damages portions. According to the process for providing pipelines with this lining material, thermocuring of the lining material applied onto the inner surface of a pipe line can be carried out by moving a nozzle for jetting pressurized steam from one end to the other end of the pipe line without applying high pressure to the pipe line. Thus, this process is particularly suited for applying a lining material to a superannuated sewage pipe line or general sewage pipe lines having damaged portions.

5 Claims, 11 Drawing Sheets

LINING MATERIAL FOR PIPE LINES AND A PROCESS FOR PROVIDING PIPE LINES THEREWITH

BACKGROUND OF THE INVENTION

1. Field of the Invention

The present invention relates to a lining material for pipe lines, chiefly those buried in the ground, such as sewage pipes, which lining material is capable of forming a rigid inner pipe for repair and/or reinforcement, and to a process for providing the pipe line with such rigid inner pipe for repair and/or reinforcement. More particularly, the present invention relates to a lining material for pipe lines already constructed and buried in the ground, for the purpose of repair and/or reinforcement, and to a process for providing the pipe lines with a fiber-reinforced or a fabric-fiber-reinforced plastic lining. The process comprises inserting into the pipe lines a lining material including a sheet impregnated with a thermohardenable resin, which sheet is somewhat overlapped in both lateral end portions slidably to form a tubular sheet, inflating the lining material by introducing a pressurized fluid thereinto and internally heating the lining material to form an integrally solidified rigid inner pipe within the pipe line.

2. Description of the Prior Art

It is well known that pipe lines, irrespective of whether they are constructed on the ground or in the ground, can be lined with a fiber-reinforced plastic material for the purpose of reinforcement and/or repair. Pipe lines buried in the ground cannot easily be decomposed for lining, or be inspected for damage. Accordingly, special arts and materials are needed for lining pipe lines buried in the ground, such as gas pipe lines, city water pipe lines and sewage pipe lines. In the past, various lining materials have been proposed for repair and/or reinforcement of such underground pipe lines. In recent years, a tubular mat of a strong fibrous material impregnated with a liquid thermohardenable resin, which is overlapped in both lateral end portions so as to be slidable and interposed between an inner tube and an outer film and is then heated to thicken the resin, has been proposed as a pipe-lining material. This mat itself is called "Sheet Molding Compound" (referred to hereinafter as SMC) by ASTM. This SMC lining material is manufactured, for example, by spreading a strong fibrous material such as glass fiber over a plastic film capable of easily splitting off, to form a fibrous mat, impregnating the fibrous mat on the film with a thermohardenable resin such as styrene or an unsaturated polyester, overlaying the mat with a tubular film and heating the mat under a controlled condition to thicken the resin by effecting partial polymerization of the resin. In this case, the resin-impregnated mat on the tubular film is overlapped in both its lateral end portions so as to be slidable in both directions to form a tubular mat. The two films on both sides of the resin-impregnated mat serve to prevent evaporation of the thermohardenable resin in the mat but the outer film is split off prior to being inserted into pipe lines.

This lining material containing SMC the main component affords, after curing, a rigid fiber-reinforced plastic (FRP) lining on the inner surface of pipe lines, thereby attaining the purpose of reinforcement and/or repair of the pipe lines. However, this lining material has the drawback that when it is inserted into pipe lines, especially long or curved ones, an extremely strong force is exerted to SMC due to frictional resistance against the inner surface of the pipe lines so that the SMC is locally stretched to reduce its thickness or suffers from various damage, and in the extreme case, breaks down in the location where damage become serious. As the SMC lining material has a number of disadvantages to be overcome in addition to the above mentioned, a new type lining material was proposed in Japanese Patent Appln. No. Hei 2-95880 (referred to hereinafter as Ref. 1). Disclosed in Ref. 1 is a newest lining material now currently used which comprises in place of the mat of SMC a sheet comprised of a fabric and a mat of fibers of high tenacity impregnated with a thickened liquid thermohardenable resin to form a fabric-fiber-reinforced composite molding sheet (referred to hereinafter simply as FCM-sheet). This FCM-sheet is also coated on both sides with two plastic films, one of which constitutes an outermost layer capable of easily splitting off before insertion of the lining material into pipe lines. Stretchability of SMC by strong tension, which is one of the great disadvantages of SMC, is overcome to a certain degree by FCM-sheet since a fabric in addition to fibers is impregnated with a thermohardenable resin, unlike SMC wherein fibers alone are impregnated with the resin so that the resultant sheet is resistant to biaxial tension. However, both SMC and FCM-sheet lining materials are similar in appearance since they are made up by overlapping both lateral end portions of the sheet material with each other to form a tubular material in such manner that the overlapped portions of the tubular material are somewhat slidable in circumferentially opposite directions in compliance with the diameter of the pipe lines. In order to facilitate insertion of the lining material into a pipe line, the diameter of the tubular sheet, the lateral end portions of which are overlapped with each other, is normally smaller than the inner diameter of the pipe line. However, the lining material once inserted into the pipe line is inflated to bring it into contact with the pipe line prior to curing.

Among underground pipe lines, a sewage pipe line is usually made of a porcelain pipe or a Hume concrete pipe and thus is brittle and easily broken by earthquake or any vicinal underground work accompanying vibration. Otherwise, sewage pipe lines, if superannuated, become so brittle that they often undergo local breakage or rupture or are damaged so as to be ready to fall into pieces. When such brittle sewage pipe lines are lined with either of the SMC or FCM-sheet lining material for reinforcement, the lining material in the form of a tube formed by overlapping both lateral end portions of the sheet so as to be slidable in circumferential direction is inserted into such pipe lines and the tubular lining material is then inflated internally by fluid pressure whereby the overlapped lateral end portions are slid in compliance with the inner diameter, i.e. the inner circumferential length of the pipe lines. If the pipe lines have a locally broken portion, the lining material is expanded out of the broken portion by internal pressure whereby the overlapped lateral end portions of the lining material are excessively slid to form a cleavage. If the pipe lines are considerably superannuated as a whole, they will be ruptured over a significant length for the reason that they are pressed internally by the expanding lining material and fall into pieces locally. In this case, sliding of the overlapped lateral end portions of the lining material goes too far so that the opening may be formed between the lateral end portions of the lining material over a significant length. Although FCM-sheet can suppress stretchability of SMC by tension, this phenomenon commonly occurs irrespective of whether the lining material is SMC or FCM-sheet as both materials wherein the lateral end portions are weakly bonded merely by the thickened liquid resin are less resistant to internal expansion by fluid pressure.

This drawback in case of using the SMC or FCM-sheet lining material can be exaggeratedly shown in the accompanying FIG. 1 wherein a lining material is inserted into a pipe line, especially a sewage pipe, having a broken portion and is inflated internally by fluid pressure. A pipe line 101 has a broken portion 102 where the lining material 103 made of SMC or FCM-sheet is spread out by fluid pressure. For exaggeration's sake, the overlapped lateral end portions 104 of the lining material are just located in the broken portion of the pipe line so that the overlapped lateral end portions which are weakly bonded by the aid of a thickened thermohardenable resin contained in the lining material are opened by the internally exerted fluid pressure. In this case, the inner tubular plastic film 105 also spreads out of the broken portion 102 of the pipe line, but this tubular film 105 is locally expanded seriously and finally ruptured by the fluid pressure to permit escape of the fluid. Even if the overlapped lateral portions 104 of the lining material 103 are not located in the broken portion 102 of the pipe line 101, the lining material 103 in the broken portion 102 is expanded while permitting separation of the lateral end portions of the lining material within the pipe line 101. The remaining tubular film 105 no longer functions as a reinforcing material for the pipe line 101.

Furthermore, it is noteworthy that the pipe line is sometimes surrounded by a high pressure underground water. If the pipe line has a broken portion, a large amount of water intrudes into the pipe line through the broken portion thereof so that the pipe line is flooded or at least submerged with water throughout. In case a lining material is applied onto the inner surface of such a pipe line, the lining material is externally wetted with water so that the lining material cannot be thermocured or at least needs a long period of time for curing, even if it is internally heated.

The FCM-sheet lining material disclosed in Ref. 1 is certainly superior in mechanical strength to the SMC lining material but the former is still unsatisfactory in mechanical properties for applying it onto pipe lines. The SMC sheet in FCM-sheet is poor in strength and elongation at the time of break-down while the fabric sheet in FCM-sheet is great in strength and elongation at the time of break-down. Thus, the SMC sheet is broken down by a weaker force as compared with the fabric sheet. In case of the FCM-sheet usually employed as a lining material and comprised of a SMC sheet of 4.0 mm in thickness and a fabric sheet of 0.3 mm in thickness, for example, these sheets showed the following properties: a strength at break-down of 43 kg/5 cm and an elongation at the time of break-down of 1.8% for the SMC sheet, and a strength at the time of break-down of 273 kg/5 cm and an elongation at the time of break-down of 24% for the fabric sheet. When tensile force is exerted on the SMC sheet, the force is concentrated of a relatively weak portion so as incur local elongation and break-down. On the other hand, the fabric sheet shows a great elongation at the initial stage of applying tensile force due to stretching of the relaxed yarns in the fabric structure, but its resistance to tensile force is rapidly increased after allowing the yarns to stretch to a certain degree. If the SMC sheet is integrally combined with the fabric sheet as in FCM-sheet, the force locally exerted to the SMC sheet is dispersed so that the strength and elongation at the time of break-down are somewhat improved. In case tensile force is increased beyond a certain limit, however, the SMC sheet alone in FCM-sheet is broken down. In the above example, the strength of the SMC sheet at the time of break-down was 57 kg/5 cm and its elongation was 2.4%. Accordingly, if a strong tensile force beyond a certain limit is exerted at the time of inserting the FCM-sheet lining material into pipe lines, the SMC sheet layer alone is broken, thus leading the lining treatment to failure. More specifically, the FCM-sheet lining material used for a conventional sewage pipe of 300 mm in diameter has a width of about 1000 mm and the strength of the SMC sheet layer thereof at the time of break-down is 1140 kg (57/50×1000). This apparently means that if a load of at least 1 ton is applied at the time of inserting the lining material into the pipe, there may be a possibility of the SMC sheet layer being broken down. In general, the load at the time of inserting a lining material into a pipe line depends on the length of the pipe line. Thus, a significant load is applied to a lining material in the event the lining material is long and the pipe line is also long. If the length of a pipe line exceeds 80 meters, the maximum load applied to a lining material being inserted into the pipe line will sometimes exceed 1 ton. Further, when the pipe line is seriously damaged or is irregular in size or is curved, the load will readily exceed 1 ton even if the length of the pipe line is far less than 80 meters.

In general, a sewage pipe line is constructed by connecting a great number of Hume concrete pipes in serial. If such Hume concrete pipes are broken locally, only damaged portions are repaired by replacing the damaged pipe with a new Hume concrete pipe. It is very common in this case that the pipe where the broken portion is formed is cut in two positions so as to remove only the broken portion and the pipes thus cut away are interconnected with a repair pipe which has an outer diameter equal to the inner diameter of the cut pipes. If such sewage pipe line has been repaired several times, therefore, the inner diameter of the pipe line varies according to the repaired positions. Accordingly, if the pipe line once repaired is again to be repaired, the second repair pipe becomes smaller in inner diameter than the first repair pipe. Thus, the pipe line is constructed as a whole by pipes with different diameters. If this pipe line is lined with a tubular lining material with a definite diameter, the lining material tends to form a wrinkle in the location of repair where the diameter of the pipe line is considerably smaller.

The lining material introduced into a pipe line is applied evenly onto the inner surface thereof by sending pressurized fluid, e.g. compressed air to the inside of the confined lining material. The lining material in this state is then internally heated to cure the thermohardenable resin to form a rigid fiber and/or fabric reinforced plastic inner pipe as a whole. A general and simple method for heating the lining material internally is to confine it, for example, with mouthpieces provided with an inlet and outlet and to introduce superheated steam into the lining material in confined state whereby the lining materially is heated internally under pressure. The curing of the thermohardenable resin is effected within a short period of time at a high temperature. In case of an unsaturated polyester, for example, curing of the resin proceeds rapidly by self-exothermic reaction. However, the outer surface of the lining material is contacted with the pipe line and the pipe line is in turn contacted with the surrounding ground so that much of heat supplied is lost. In order to heat the lining material sufficiently, therefore, the pressure of the superheated steam has to be elevated to about 3 kg/cm² for heating the lining material at 100° C. or higher. Care should be taken, however, that Hume concrete pipes usually used for sewage pipes are poor in pressure-resistance and tend to rupture under pressure of about 2 kg/cm². This tendency is significant if the pipe line is superannuated. In a conventional method for heating the lining material, therefore, a high pressure steam cannot be used and a considerable period of time is needed for heating the lining material.

Under the above circumstances, a need arises for improving a means for applying a lining material to pipe lines having damaged portions, especially superannuated sewage pipe lines in a simple and economical manner and also a great demand for developing a new type lining material which can be inserted into a pipe line having damaged portions without difficulty and is capable of forming a rigid fiber-reinforced or fabric-fiber-reinforced plastic (FRP) lining on the inner surface of such pipe line.

SUMMARY OF THE INVENTION

Accordingly, it is an object of the present invention to provide a new lining material which can be applied onto the inner surface of a pipe line having damaged portions to form a rigid fiber-reinforced or fabric-fiber-reinforced plastic lining.

It is another object of the present invention to provide a lining material capable of being inserted into a pipe line having damaged portions and capable of being thermocured to form a rigid fiber-reinforced or fabric-fiber-reinforced plastic lining even if underground water intrudes into the pipe line.

It is still another object of the present invention to provide a lining material capable of being inserted into a pipe line without causing any break-down of the resin-impregnated sheet under strong tensile force and capable of forming a rigid fiber-reinforced or fabric-fiber-reinforced plastic lining.

A further object of the present invention to provide a process for providing a pipe line having damaged portions with a lining material capable of forming a rigid fiber-reinforced or fabric-fiber-reinforced plastic lining wherein the lining material is applied onto the inner surface of the pipe line and then the resin-impregnated sheet is thermocured.

It is still a further object of the present invention to provide a process for providing a pipe line, especially a sewage pipe line with a lining material capable of forming a rigid fiber-reinforced or fabric-fiber-reinforced plastic lining wherein the resin-impregnated sheet is heated above 100° C. without applying high pressure to the inflated lining material.

It is yet a further object of the present invention to provide a process for providing a pipe line, especially a sewage pipe line with a lining material capable of forming a rigid fiber-reinforced or fabric-fiber-reinforced plastic lining wherein the lining material is applied onto the inner surface of the pipe line varying in diameter without formation of any wrinkle.

Other objects, features and advantages of the present invention will become apparent more fully from the following description.

As a result of extensive research made for developing a new type lining material which overcomes all of the drawbacks as seen in case of applying it, especially for sewage pipe lines, it has now been found that a valuable lining material can be obtained by providing the outer surface of the SMC or FCM-sheet with a fabric-like or net-like tubular material or with a tubular material coated with a water-proof film thereby enabling application of the lining material to a pipe line having broken portions without permitting expansion of the lining material from the broken portion of the pipe line and that another valuable lining material can be obtained by constructing the fiber-reinforced or fabric-fiber-reinforced composite molding sheet in the form of a plurality of separated sheet fractions in lengthwise and/or lateral direction in such manner that the lengthwise and/or lateral end portions of the individual separated sheet fractions are overlapped so as to be slidable over each other in opposite directions thereby enabling insertion of the lining material into a pipe line without strong tensile force being exerted on the lining material because of absorption of such tensile force in the places where a little sliding of the individual separated sheet factions occurs. It has also been found that the process for providing a pipe line with a lining material can be carried out advantageously, without elevating internal pressure in the pipe line at the time of thermocuring, by allowing a steam nozzle for heating the lining material to move from one end to the other end of the pipe line and that the process for providing a pipe line system comprising a series of plural pipes having different diameters with a lining material can effectively be carried out by applying onto the inner surface of the pipe line system a lining material comprised of (a) an inner tube expansive up to the maximum circumferential length of the pipe line system which is folded in a flattened state within the width corresponding to at most the minimum inner diameter of the pipe line system, (b) a fiber-reinforced or fabric-fiber-reinforced composite molding sheet having a circumferential length somewhat longer than the inner circumferential length of the pipe line system having the maximum diameter which covers the outer surface of the inner tube in such manner that both lateral end portions of the sheet overlap each other slidably in opposite directions, and (c) a tubular covering material, inflating the lining material internally in compliance with the pipe line system and then thermocuring the sheet to form a fiber-reinforced or fabric-fiber-reinforced plastic lining on the inner surface of the pipe line without permitting the formation of any wrinkle. The present invention has been accomplished on the basis of the above finding.

In accordance with one embodiment of the present invention, there is provided a lining material for pipe lines which comprises a flexible tubular film and a resin impregnated sheet covering the outer surface of the tubular film, characterized in that the resin-impregnated sheet is comprised of a mat of fibers of a high tenacity and optionally a fabric impregnated with a thickened liquid thermohardenable resin to form a fiber-reinforced or fabric-fiber-reinforced composite molding sheet having a sufficient length and also a width greater than the inner circumferential length of a pipe line to be treated, both lateral end portions of the sheet overlapping each other slidably in opposite directions so as to make the sheet in a tubular form, and that the sheet is overlaid on the outer surface thereof and over the full length thereof with a tubular covering material having a strong resistance to tensile force.

In the lining material of this invention, it is preferable that the fabric is positioned in the fabric-fiber-reinforced composite molding sheet near to the outermost surface. It is also preferable in the lining material that the flexible tubular film positioned in the innermost portion be elastic and air-tight and can be expansively inflated by inner pressure exerted by a pressurized fluid.

In accordance with the first variant of the above embodiment, there is provided a lining material wherein the tubular covering material is a fabric-like material coated on at least an outer surface thereof with a waterproof film.

In accordance with the second variant of the above embodiment, there is provided a lining material wherein a fabric layer is fully coated with the fiber-reinforced or fabric-fiber-reinforced composite molding sheet composed of a plurality of separated sheet fractions in lengthwise and/or lateral direction in such manner that the lengthwise and/or lateral end portions of the individual separate sheet fractions are overlapped so as to be slidable over each other in opposite directions to form a composite sheet material as a whole, both lateral end portions of the composite sheet material being so overlapped that the composite sheet material may become tubular and the fabric layer may constitute the outer layer of the sheet material, and the composite sheet material is provided on the inner surface thereof with a flexible tubular film.

In accordance with the third variant of the above embodiment, there is provided a lining material comprised of (a) a flexible tubular film 2 as the innermost layer which is expansive up to the circumferential length corresponding to the maximum inner diameter of a pipe line system comprising plural pipe lines of different diameters arranged in serial and is folded several times at a folding point where the width of the folded film is within the width equal to or somewhat smaller than the minimum inner diameter of the pipe line system, (b) a mat of fibers of a high tenacity and optionally a fabric layer integrally impregnated with a thickened liquid thermohardenable resin to form a fiber-reinforced or fabric-fiber-reinforced composite molding sheet as an intermediate layer which has a circumferential length somewhat larger than the inner circumferential length corresponding to the pipe line system having the maximum diameter and covers the outer surface of the flexible tubular film, both lateral end portions of the sheet overlapping each other slidably over a certain length and (c) a tubular covering material as the outermost layer having strong resistance to tensile force and water-resistance, the circumferential length of the lining material being equal to or somewhat smaller than the inner circumferential length of the pipe line system having the minimum diameter.

In accordance with another embodiment of the present invention, there is provided a process for providing pipe lines with a fiber-reinforced or fabric-fiber-reinforced plastic lining, which comprises inserting into the pipe lines a lining material composed of a flexible tubular film as an innermost layer, a mat of fibers of high tenacity and optionally a fabric impregnated with a thickened liquid thermohardenable resin to form a fiber-reinforced or fabric-fiber-reinforced composite molding sheet as an intermediate layer, both lateral end portions of the sheet being overlapped with each other slidably so as to form the sheet in a tubular form, and a tubular covering material having a strong resistance to tensile force as an outermost layer, closing both terminal ends of the lining material, inflating the lining material by introducing a pressurized fluid thereinto whereby the overlapped portions of the sheet are so slid as to be contacted evenly with the inner surface of the pipe lines, and thereafter heating the lining material to cure the thermohardenable resin in the sheet to form an integrally bonded fiber-reinforced or fabric-fiber-reinforced plastic lining on the inner surface of the pipe lines.

In accordance with the first variant of the above embodiment, there is provided a process wherein the heating of the lining material to cure the thermohardenable resin is carried out by allowing a steam nozzle for jetting superheated steam to move from one end to the other end of the pipe line or by firstly introducing a heating fluid into the lining material for preheating and then allowing a steam nozzle for jetting superheated steam to move from one end to the other end of the pipe line.

In accordance with the second variant of the above embodiment, there is provided a process wherein a lining material comprised of (a) a flexible tubular film 2 as the innermost layer which is expansive up to the circumferential length corresponding to the maximum inner diameter of a pipe line system comprising plural pipe lines of different diameters arranged in serial and is folded several times at a folding point where the width of the folded film is within the width equal to or somewhat smaller than the minimum inner diameter of the pipe line system, (b) a mat of fibers of a high tenacity and optionally a fabric layer integrally impregnated with a thickened liquid thermohardenable resin to form a fiber-reinforced or fabric-fiber-reinforced composite molding sheet as an intermediate layer which has a circumferential length somewhat larger than the inner circumferential length corresponding to the pipe line system having the maximum diameter and covers the outer surface of the flexible tubular film, both lateral end portions of the sheet overlapping each other slidably over a certain length and (c) a tubular covering material as the outermost layer having strong resistance to tensile force and water-resistance, the circumferential length of the lining material being equal to or somewhat smaller than the inner circumferential length of the pipe line system having the minimum diameter, is applied onto the inner surface of a pipe line system, inflating the lining material by introducing pressurized fluid thereinto whereby the lining material is expanded by allowing the overlapped lateral end portions to slide in compliance with each pipe line in the system having a different diameter, and heating the sheet to cure the thermohardenable resin therein to form a fiber-reinforced or fabric-fiber-reinforced plastic lining.

In the plastic lining formed on the inner surface of the pipe line, the flexible tubular film exists in the innermost position of the lining. After completion of the pipe-lining treatment, the flexible tubular film may be removed by drawing a turning belt previously attached to one terminal end of the lining material in the direction of the other terminal while everting the film. In case a mat of fibers of high tenacity, such as a mat of glass fibers is used alone in SMC, the fibers are integrally impregnated with the thermohardenable resin and affords, after heating, a glass fiber-reinforced plastic (FRP). In case a fabric layer is overlaid with a mat of glass fibers, the fabric layer and the mat are together impregnated with the resin and affords, after heating, an FRP having an integrally combined fabric layer on one side.

In the present invention, it is preferred that the liquid thermohardenable resin comprises an unsaturated polyester resin or an epoxy acrylate resin each having a maximum exothermic temperature according to JIS K-6901 of at least 200° C. It is also preferable that such liquid thermohardenable resin contains styrene-butadiene-styrene block copolymer, polystyrene, polyethylene, methyl polymethacrylate, polyvinyl acetate, saturated polyester, urethane-modified saturated polyester and/or polycaprolactone as a low shrinkage additive, barium sulfate, talc, aluminum hydroxide and/or glass powder as a filler, magnesium oxide and/or magnesium hydroxide as a thickening agent, and an organic peroxide having a decomposition temperature of 60°–90° C. for rendering the half-life for 10 hours as a curing catalyst.

In case the FCM-sheet is used, it is preferably provided on the innermost surface thereof with a non-woven fabric layer whereby the non-woven fabric layer integrally combined with the resin in the resultant lining will enhance abrasion-resistance against any solid particles contained in sewage.

Examples of the fluid to be introduced into the pipe line under pressure for inflating the lining material include air, nitrogen, water, etc. The use of water is not preferred since it degrades curing of the resin by heating. Most preferable is the use of compressed air.

BRIEF DESCRIPTION OF THE DRAWINGS

The present invention can more fully be understood from the following description taken in conjunction with the accompanying drawings in which.

Throughout these drawings, the same reference numerals have the same meanings unless otherwise specifically indicated.

DETAILED DESCRIPTION OF THE PREFERRED EMBODIMENTS

Figure 1:
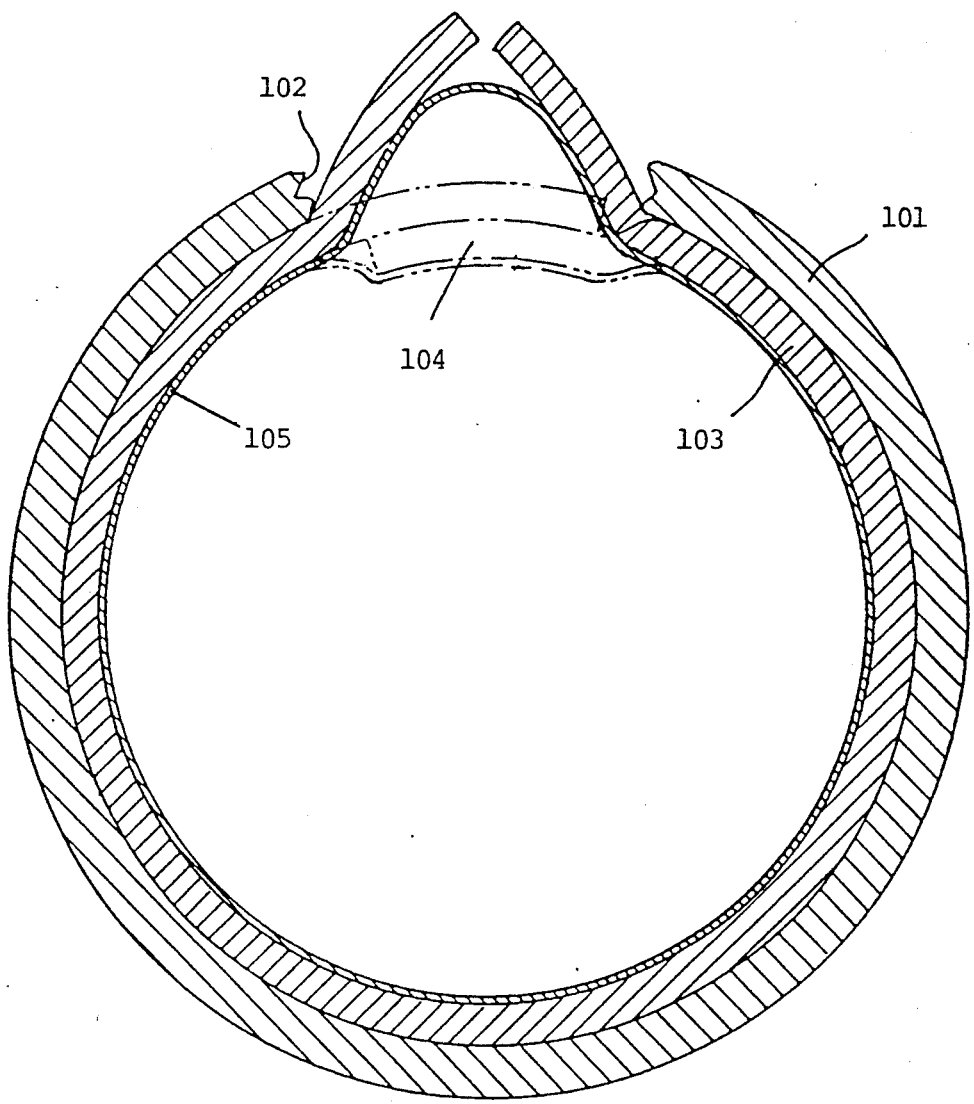
FIG. 1 is a cross sectional view exaggeratedly showing the state of a conventional lining material applied onto the inner surface of a pipe line having a broken portion.

In FIG. 1, the drawbacks of the conventional lining material in case of being applied onto the inner surface of a pipe line having broken portions has already been explained in detail hereinbefore.

Figure 2:
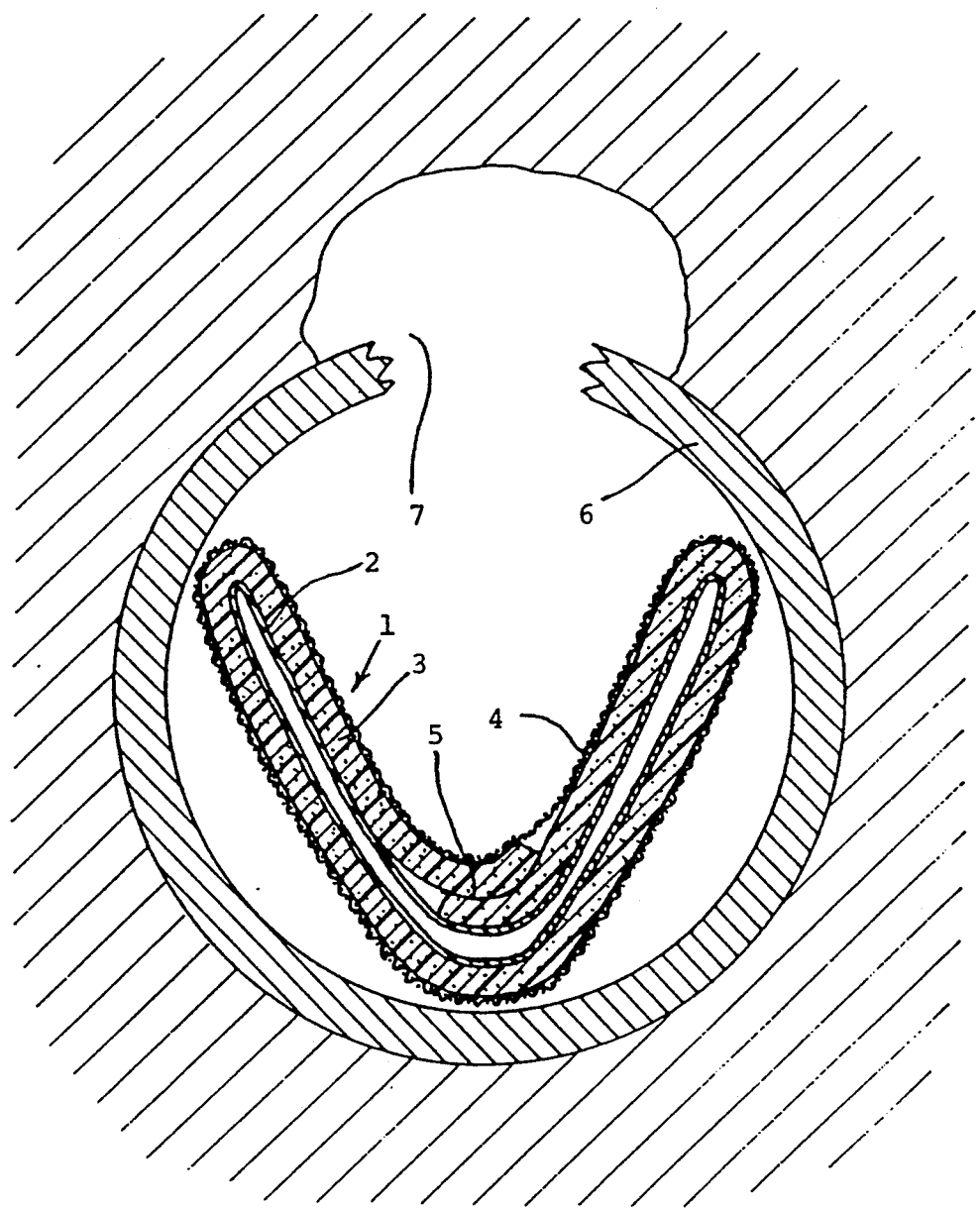
FIG. 2 is a cross sectional view showing the state of an example of the lining material of this invention inserted into a pipe line having a broken portion.
Figure 5:
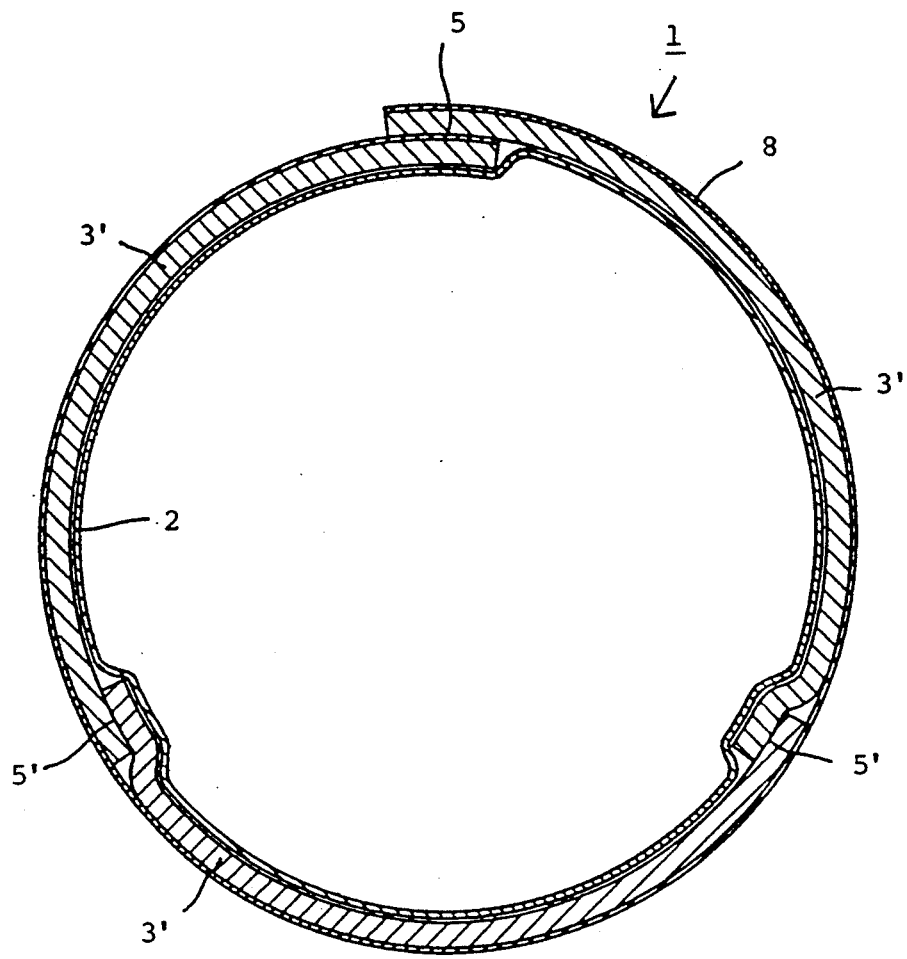
FIG. 5 is a cross sectional view showing the state of simply inflating the lining material shown in FIG. 4 without a pipe line, merely for the purpose of showing the structure of the lining material.

In FIG. 2 showing a typical example of the lining material of this invention in the state of being inserted in a broken pipe line, a lining material 1 comprises a flexible tubular film 2 overlaid on the outer surface thereof with a fiber-reinforced or fabric-fiber-reinforced composite molding sheet 3 which is overlaid on the outer surface thereof with a tubular covering material 4. The sheet 3 has been impregnated previously with a thickened liquid thermohardenable resin and is normally prepared by impregnating the sheet 3 with a liquid thermohardenable resin and heating the sheet at a controlled temperature to effect partial polymerization of the resin. The flexible tubular film 2 is made of an elastic synthetic resin and is capable of being expansively inflated by inner pressure. Over the full length, the sheet 3 is overlapped in both lateral end portions to a certain width to form an overlapped portion 5 where both lateral end portions are attached to each other to a certain width by the aid of the thickened thermohardenable resin and are slidable in opposite directions in compliance with the inner circumferential length of a pipe line to be treated. The sheet 3 is overlaid on the outer surface with the tubular covering material 4 which is a fabric-like or net-like tubular material and is flexible and somewhat expansive by inner pressure. In case the tubular covering material 4 is a fabric-like tubular material, it may be coated on at least an outer surface thereof with a water-proof film to render the material water-resistant. The lining material 1 thus constructed is then inserted into a pipe line 6 having a broken portion 7 according to a conventional manner, for example, a method using a drawing belt as shown in FIG. 5 of Ref. 1. In this case, the lining material 1 is introduced in a laterally bent state, forming "U" or "V" shape in cross section while being kept in a flattened state, as shown in FIG. 2.

Figure 3:
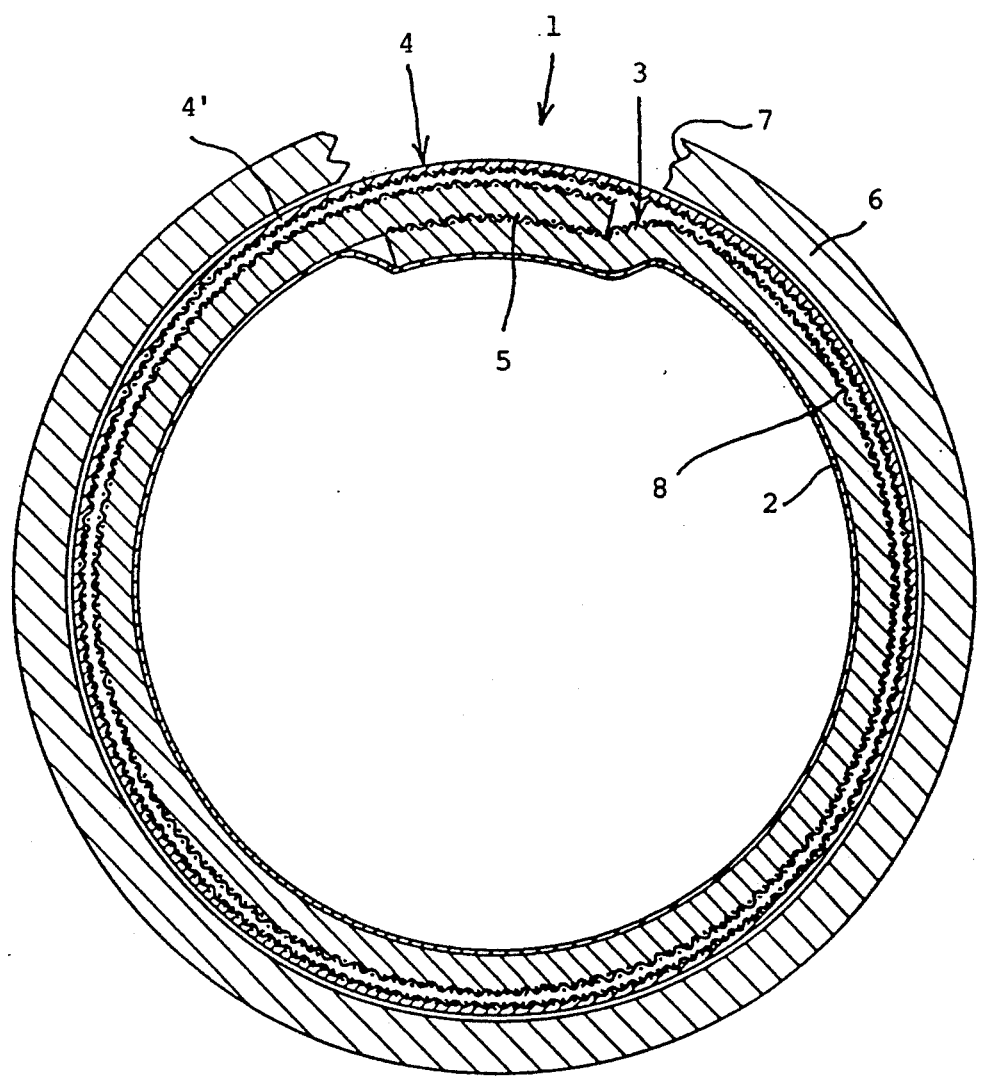
FIG. 3 is a cross sectional view showing the state of a specific example of the lining material of this invention applied onto the inner surface of a pipe line having a broken portion.

In FIG. 3 showing the state of the lining material 1 being inflated in the pipe line 6 having the broken portion 7, the lining material 1 inserted in a flattened state into the pipe line 6 is inflated by pressurized fluid such as compressed air. In this case, the tubular covering material 4 constituting the outermost layer of the lining material exhibits strong resistance to tensile force exerted at the time of inflation and serves to prevent outward expansion of the lining material 1 beyond the broken portion 7 of the pipe line 6 as shown in FIG. 1. In the lining material 1 in an inflated state, the sheet 3 expands in such a manner that both lateral end portions in the overlapped portion 5 are allowed to slide in opposite directions so that the outer circumferential length becomes equal to that of the inner surface of the pipe line 1. The flexible tubular film 2 and the tubular covering material 4 are inherently flexible and elastic so that they expand readily in accordance with expansion of the sheet 3. The tubular covering material 4 as the outermost layer of the lining material 1 can be provided on the sheet 3 by wrapping the sheet 3 which has been overlapped in both lateral end portions with the material 4 and stitching both ends of the material 4 with a yarn or the like. The lining material 1 thus laminated is preferably wrapped with a plastic film for preventing any evaporation of the liquid thermohardenable resin such as styrene in the sheet 3. This mode is particularly desirable when the material 4 is a net-like material. Such plastic film can be split off just before introducing the lining material 1 into the pipe line 6.

When the pipe line is surrounded with high pressure underground water, such water intrudes together with soil and sand into the pipe line through the broken portion 7 whereby the pipe line is flooded or at least submerged with water to make thermocuring of the resin impossible or too much delayed. As shown in FIG. 3, a FCM-sheet having a fabric layer 8 on the outermost layer thereof is used for the sheet 3 and a flexible fabric-like material coated on at least outer surface thereof with a water-proof film 4' is used to make the lining material water-resistant. Accordingly, no problem arises in the lining material shown in FIG. 2 with respect to the nature of the ground. Thus, the lining material 1 has a water-proof film on the outermost layer, and so the use of a plastic film for preventing evaporation of a liquid thermocurable resin may be omitted in this case without any trouble.

Figure 4:
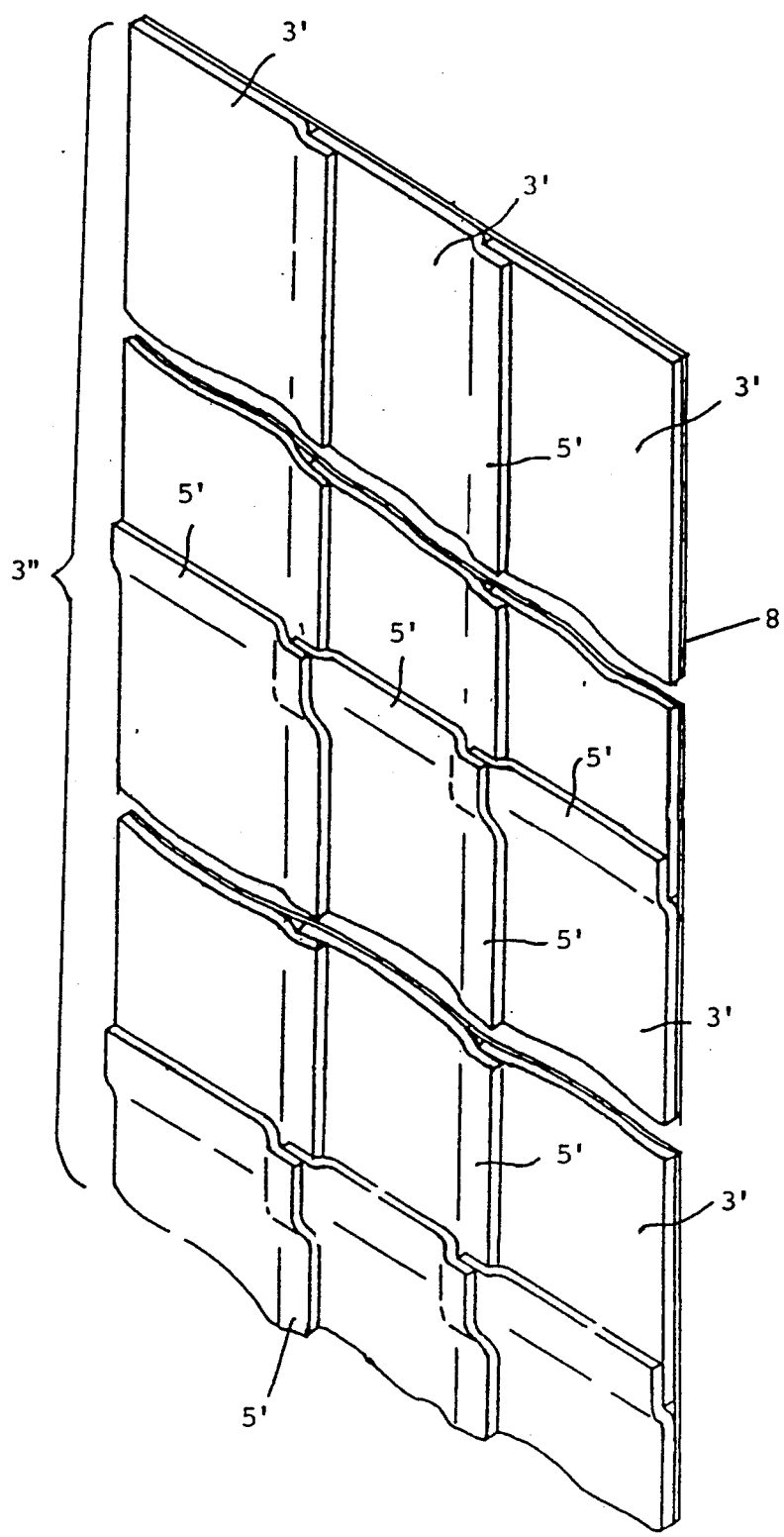
FIG. 4 is a perspective view of another example of the lining material of this invention showing the state of being overlapped in lateral and lengthwise end portions.

In FIG. 4 showing another example of the lining material, a fabric layer 8 is fully coated with the fiber-reinforced or fabric-fiber-reinforced composite molding sheet composed of a plurality of separated sheet fractions 3' arranged in lengthwise and/or lateral direction in such manner that the lengthwise and/or lateral end portions of the individual separate sheet fractions 3' are overlapped so as to be slidable over each other to form a composite sheet material 3'' as a whole. In this case, each of the sheet fractions 3' is the same in construction as the sheet 3 as in the case of FIGS. 2-3, but is only different in size. In other words, the sheet material 3'' corresponding to the sheet 3 is composed of several units of the sheet fractions 3'. Accordingly, the individual sheet fraction 3' may be manufactured by simply cutting the sheet 3 in square. Both lateral end portions of the composite sheet material 3'' is so overlapped, as in the case of the sheet 3 in FIG. 2 or 3, that the composite sheet material 3'' may become tubular and the fabric layer 8 may constitute the outer layer of the sheet material. It follows that if SMC is used as the individual sheet fractions 3', the composite sheet material 3'' as a whole will become the fabric-fiber-reinforced composite molding sheet, i.e. the FCM-sheet. As in the case of the lining material shown in FIGS. 2-3, the composite sheet material 3'' is provided on the inner surface thereof with the flexible tubular film 2.

The length of the individual sheet fractions 3' in lengthwise direction is preferably 30 meters or less although it varies according to the maximum load applied to the lining material in case of inserting it into a pipe line. If the length of the individual sheet 3' exceeds 30 meters, the composite sheet material may be broken down at any of the overlapped portion 5' when a strong tensile force is exerted on the sheet material because the friction between the fabric layer 8 and the sheet fractions 3' is so great that the individual sheet fractions 3' cannot be slid in the overlapped portion 5'. The composite sheet material may be furnished with a higher resistance to tensile force by shortening the length of the individual sheet fractions 3'. If a plurality of the sheet fractions are arranged in lateral direction, 2–5 sheet fractions are generally arranged although the number may be varied according to the diameter of the pipe line to be treated and the expected size of broken portions in the pipe line. In case a pipe line has a significantly large diameter, however, it is not desirable to make the width of the individual sheet fractions 3' excessively large.

In this case, the width of the individual sheet fractions is preferably limited to not more than 1 meter although the number of the fractions exceeds 5.

In FIG. 5 showing the cross section of the inflated lining material 1 shown in FIG. 4, the lining material 1 has small overlapped portions 5' (two overlapped portions 5' in the drawing) and one overlapped portion 5 for the composite sheet material 3''. In this example, the lining material 1 has a sandwich structure wherein the sheet 3 is interposed between the flexible tubular film 2 and the fabric layer 8. In general, the width of the overlapped portion 5' of the sheet fraction 3' in lateral direction is within the range of 10–30 cm while that in lengthwise direction is within the range of 20–100 cm. In case of the composite sheet material 3'' or the sheet 3, the width of the lining material 1 in the overlapped portion 5 is generally somewhat larger than the above case and is within the range of 10–50 cm although the width may be varied according to the inner diameter of a pipe line to be treated.

Figure 6:
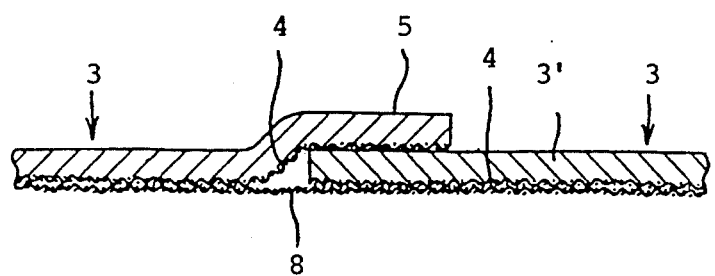
FIG. 6 is a partially enlarged cross sectional view showing the structure of the overlapped end portions of an example of the lining material of this invention.

In FIG. 6 showing the overlapped portion of the lining material 1, it is derived from FCM-sheet which has inherently a fabric layer 8. Accordingly, the lining material 1 has the fabric layer 8 in duplicate in the drawing and the use of the lining material in this mode is preferable. The fabric layer 8 in the FCM-sheet may be arranged so that the fabric layer 8 may exist in the opposite side the fabric layer 8 used for the sheet fractions. According to the conditions of the pipe line to be treated, the individual sheet fractions 3' may be wider in lateral direction but shorter in lengthwise direction or vice versa.

Figure 7:
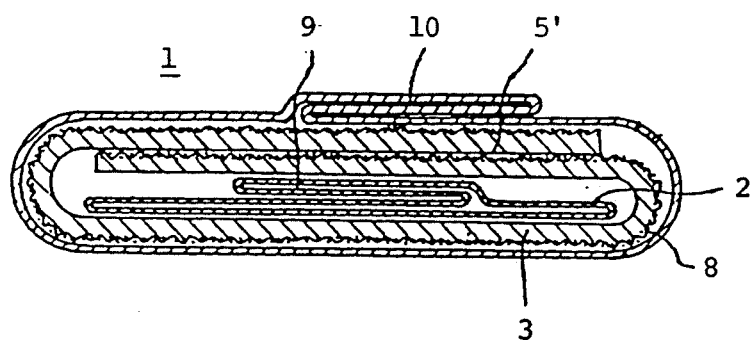
FIG. 7 is a cross sectional view showing still another example of the lining material of this invention folded a flattened state.

In FIG. 7 showing a cross sectional view of still another example of the lining material of this invention, this lining material (1) is composed of (a) a flexible tubular film 2 which is expansive up to the circumferential length corresponding to the maximum inner diameter of a pipe line system comprising plural pipe lines of different diameters and is folded at a folding point 9 where the width of the film (2) is within the width equal to or somewhat smaller than the minimum inner diameter of the pipe line system and (b) a mat of fibers of a high tenacity and optionally a fabric layer integrally impregnated with a thickened liquid thermohardenable resin to form a fiber-reinforced or fabric-fiber-reinforced composite molding sheet 3 which has a circumferential length somewhat larger than the inner circumferential length corresponding to the pipe line system having the maximum diameter and covers the outer surface of the flexible tubular film 2. Both lateral end portions of the sheet 3 overlap each other slidably in an overlapped portion 5 and the circumferential length of the lining material 1 is equal to or somewhat smaller than the inner circumferential length of the pipe line system having the minimum diameter.

In this lining material 1, the flexible tubular film 2 constituting the innermost layer has a diameter corresponding to the pipe line having the maximum inner diameter among the pipe line system. This means that the circumferential length of the film 2 is almost equal to the circumferential length of the pipe line having the maximum diameter and that the film 2 is applicable to the pipe line of such diameter. Simultaneously, the film 2 folded several times in flattened state at the folding point 9 must have a width equal to or somewhat smaller than the width of the pipe line having the minimum diameter. This means that the film 2 can be inserted into the pipe line system of the narrowest portion. Likewise, the sheet 3 is somewhat larger in circumferential length than the pipe line having the maximum diameter. This means that the sheet can be overlapped in both lateral end portions in the overlapped portion 5 and can be inserted in such state into the pipe line having the maximum diameter. As the sheet 3 is rather thick and so cannot be folded many times, it is overlapped in both lateral end portions in the overlapped portions 5 over a relatively longer distance so as to be slidable over each other in opposite directions. The tubular covering material 4 forming the outermost layer may be water-resistant as in the lining material shown in FIGS. 2 and 3 and may be folded several times in flattened state at the folding point 10 outwardly to reduce its circumferential length and diameter so that its outer circumferential length is smaller in folded state than the inner circumferential length of the pipe line having the minimum diameter, thus enabling insertion of the lining material 1 into the narrowest pipe in the pipe line system.

According to the process of this invention, the lining material is inserted into a pipe line and inflated therein by the aid of a pressurized fluid in a conventional manner. As the lining material of this invention is overlapped in both lateral end portions slidably to reduce its circumferential length, the overlapped portions are allowed to slide in opposite directions at the time of inflation to increase its circumferential length whereby the lining material is brought into contact closely with the inner surface of the pipe line. The tubular covering material constituting the outermost layer of the lining material, i.e. the layer contacting the inner surface of the lining material, serves to suppress spreading out of the lining material in broken portions of the lining material and/or rupture of the pipe line caused by inner pressure.

The lining material thus arranged in the pipe line is then heated to cure the thermohardenable resin as binder. By properly selecting the kind of resins, curing of the resin can be made, for example, by irradiation of ultraviolet rays. In the majority of cases, however, curing of the resin is carried out by heating. According to the process of this invention, the lining material can be heated above 100° C. without application of high pressure for curing the thermohardenable resin rapidly.

Figure 8:
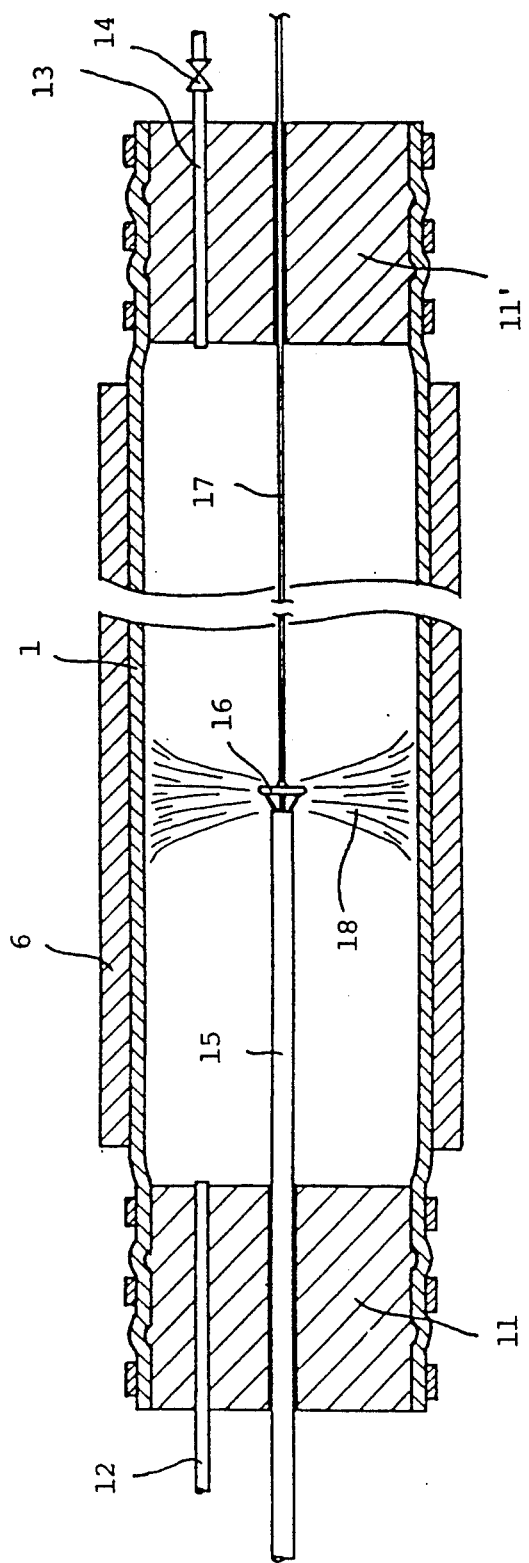
FIG. 8 is an explanatory drawing showing the state of heating the lining material for curing.

In FIG. 8 showing the state of heating the lining material 1 inflated in the pipe line 6, both terminal ends of the lining material 1 in the pipe Line 6 are blocked respectively with mouthpieces 11 and 11' equipped with an inlet 12 and an outlet 13 for a pressurized fluid. According to one mode of the heating operation, compressed air as the pressurized fluid is introduced through the inlet 12 into the inside of the lining material 1 while controlling the amount of air exhausted through the outlet 13 by way of a valve 14 whereby the interior space of the lining material 1 is pressurized. The air pressure at this time is preferably 0.2–1.0 kg/cm$^2$ which is sufficient enough to inflate the lining material to bring it into close contact with the inner surface of the pipe line. A steam hose 15 is slidably penetrated through the mouthpiece 11 and is provided at the tip thereof with a nozzle 16 which is connected to a drawing cable 17 extending outside beyond the mouthpiece 11 and capable of drawing the steam hose 15 toward the opposite mouthpiece 11'. The nozzle 16 can jet pressurized steam 18 radially which is supplied from a boiler or the like steam reservoir (not shown) through the steam hose 15. As the steam is jetted radially, the nozzle 16 is desirably located in the central position of the pipe line 6 as shown in FIG. 8, but it may be somewhat pendant on account of its own weight. The superheated steam 18 is jetted toward the inner surface of the lining material 1 while maintaining the pressure in the interior space. No special limitation exists on the pressure of the superheated steam, so long as it can heat the lining material sufficiently. Usually, a pressure of at least 3 kg/cm$^2$ is preferable for this purpose. The pressure in the interior space is elevated by jetting superheated steam, but excess steam is exhausted from the outlet 13 thereby maintaining the inner pressure constant. The heating operation is carried out by drawing the nozzle 16 toward the mouthpiece 11 (from the left to the right in the drawing) by the drawing cable 17 from the outside of the pipe line 6 while allowing superheated steam to jet toward the inner surface of the lining material 1 over the full length thereof. Moving of the nozzle 16 from one end to the other end of the lining material may be done continuously at a constant velocity or intermittently. When the nozzle 16 reaches the end of the pipe line 1, i.e. the right end in the drawing, the heating operation is finished by stopping the jetting of superheated steam and the lining material is allowed to cool. After completion of the cooling, the sheet in the lining material is completely cured to form as a whole a rigid pipe of FRP inside the pipe line.

In another mode of this heating operation, compressed air is first introduced into the interior space through the inlet 12 to inflate the lining material 1 for bringing it into close contact with the inner surface of the pipe line 6. The compressed air is then replaced by pressurized steam to effect preliminary heating of the lining material. The pressure of the steam in this case is not so high and preferably equal to that of the compressed air. Hot blast may be used in place of the low pressurized steam. A high pressure of steam 18 is then jetted from the nozzle 16 while introducing a low pressure of steam into the interior space through the inlet 12. The heating operation is carried out as in the first mode by moving the nozzle from one end to the other end of the lining material.

In the heating operation according to the first and second modes, steam used for heating is condensed and pooled in the confined interior space. In this case, the condensed water in the neighborhood of the nozzle is blown out by the jetted steam so that no problem takes place in the heating operation. Even if the condensed water is pooled to a certain degree, the nozzle is submerged to heat water and the lining material is heated by water thereby continuing the heating operation. If the amount of condensed water is too large, however, the heat of superheated steam is absorbed by such water to disturb the heating operation so that curing of the resin needs a considerably longer period of time.

Figure 9:
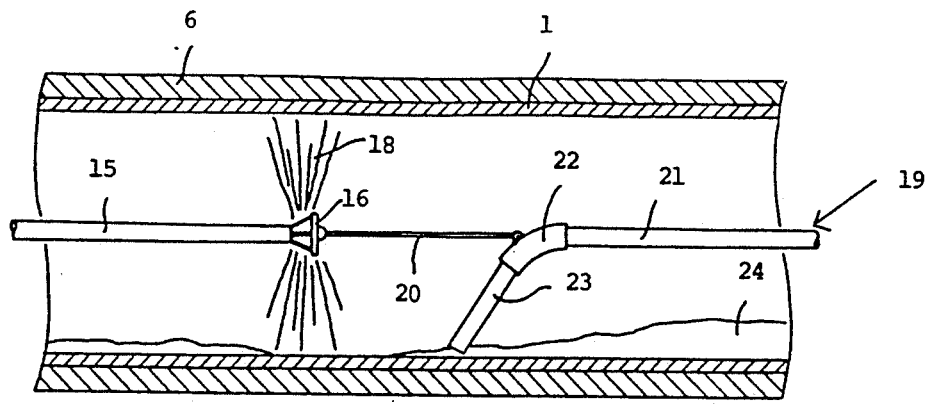
FIGS. 9(A)–9(C) are explanatory drawings showing the various modes of removing water pooled in the pipe line.
Figure 9:
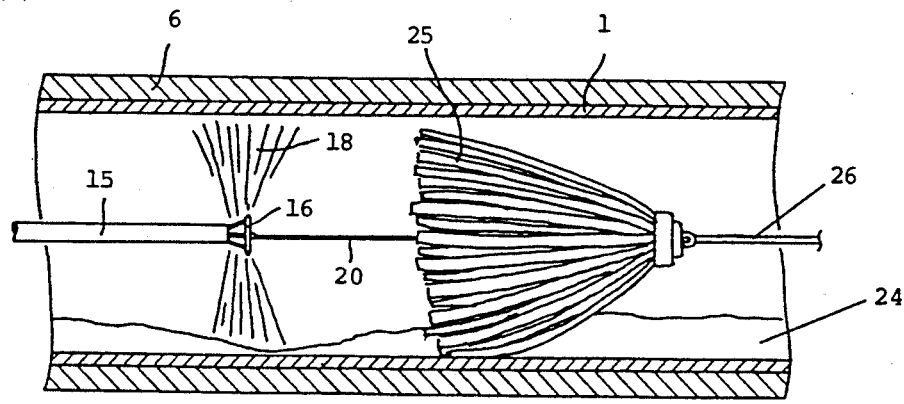
Figure 9:
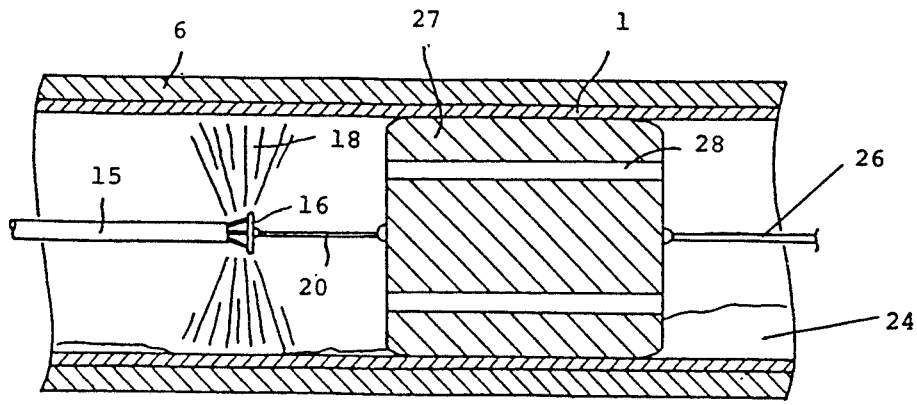

FIGS. 9(A)-9(C) show the various modes of removing water pooled in the lining material in the course of the heating operation.

In FIG. 9(A), the nozzle 16 is provided at the tip thereof with a drain pipe 19 via a rope (or belt) 20. As the drain pipe 19 is positioned just in front of the nozzle 16 and connected through the rope 20, the superheated steam 18 is jetted from the nozzle 16 to the inner surface of the lining material 1 from one end to the other end thereof while the drain pipe 19 is moved from one end to the other end of the pipe line 6. The drain pipe 19 comprises, for example, a straight pipe 21 extending up to the outside through the mouthpiece, an elbow 22 to which the rope 20 connecting the nozzle 16 is attached, and an exhaust nozzle 23. As the interior space is kept under pressure, the pooled water 24 is easily collected by the exhaust nozzle 23.

In FIG. 9(B), a water-removing tool is a big mop 25 made of a lot of fabric strips which is drawn from the outside through a rope (or belt) 26 and is connected to the nozzle 16 via the rope 20. This mop 25 moves just in front of the nozzle 16 from one end to the other end of the pipe line whereby the mop 25 sweeps the water 24 and absorbs a part of water 24.

In FIG. 9(C), the water-removing tool is a drum 27 through which plural penetrating holes 28 are formed. This drum is also located just in front of the nozzle 16 and moves from one end to the other end of the pipe line 6. The pooled water is exhausted from the interior space through the penetrating holes 28.

According to the present invention, a number of technical advantages can be achieved. Firstly, the lining material of this invention can be applied to sewage pipe lines having damaged portions or superannuated sewage pipe lines. In case these pipe lines are to be reinforced, care should be taken in the conventional process to prevent the drawback as shown in FIG. 1 and any rupture of the pipe line at the time of inflating the lining material therein. Since the lining material of this invention provided with the specific covering material as the outermost layer which is resistant to tensile force, any outward expansion of the lining material from broken portions of the pipe line and any rupture of superannuated pipe lines at the time of inflating the lining material can effectively be prevented.

It is also an advantage of this invention that if the covering material is water-proof, intrusion of high pressure underground water through damaged portions of pipe lines can effectively be prevented as shown in FIG. 3. It is known that water intruded into the lining material degrades curing of the thermohardenable resin contained therein. According to the present invention, thermocuring of the resin can be carried out rapidly without trouble since the sheet containing the resin is separated from the covering material and thermally shielded.

It is a further advantage merit of the present invention that the lining material can be inserted into pipe lines by relatively weak tensile force, especially in the embodiment shown in FIG. 4. This is due to the fact that strong tensile force is absorbed in a number of overlapped portions of the sheet fractions existing in lateral and/or lengthwise direction. Thus, the lining material is not broken down even in the event a strong tensile force is exerted thereon.

It is still another advantage of the present invention that the lining material designed as shown in FIG. 7 can be inserted smoothly into a pipe line system comprised of plural pipes arranged in serial having different diameters. In case the inner circumferential length of the pipe line is large, for example, the sheet overlapped in both lateral portions over a certain length will be slide over each other in opposite directions to increase the circumferential length of the lining material. On the other hand, when the inner circumferential length of the pipe line is small, the sheet will be slid a little and the tubular film will be increased in its circumferential length only slightly by extending of the film from its folding point.

According to the process of this invention, superheated steam is directly jetted from the moving nozzle to the lining material over its full length so that the lining material is rapidly heated to cause thermocuring of the resin without permitting elevation of the pressure in the pipe line. Accordingly, any rupture of superannuated sewage pipe lines by increase in internal pressure can be prevented. The thermal efficiency can be increased by establishing the preliminary heating operation, and the steam pressure in the pipe line can be maintained constantly under low pressure by providing the outlet for exhaust. In addition, water pooled in the lining material can easily be exhausted spontaneously by the inner pressure or by connecting an evacuation pump to the exhaust pipe. The use of a mop serves to keep the temperature constant by stirring the hot water.

The following Experimental Examples and Comparative Example illustrate the effect of the heating operation according to the present invention.

EXPERIMENTAL EXAMPLE 1

Using Hume concrete pipes of 300 mm in diameter and 2 m in length, a pipe line of 48 meters in full length was constructed in a conventional manner. A lining material of this invention was inserted into the pipe line and both ends thereof was blocked. This lining material was then applied onto the inner surface of the pipe line by introducing compressed air of 0.5 kg/cm$^2$, and a commercially available temperature sensor was set on the outer surface of the lining material at locations of 0, 5, 15, 30, 45 and 48 m distant from one end of the pipe line and interposed between the lining material and the pipe line. An SMC was used as material, this SMC having the lining been manufactured by dispersing glass fibers in an unsaturated polyester resin and thickening the resin. This SMC was cured for 1 hour at 70° C. and for 3 minutes at 100° C. A steam nozzle was moved from one end to the other end of the pipe line at a velocity of 0.5 m/min. while jetting pressurized steam of 3 KG/cm$^2$ from the nozzle. The change in temperature measured by the temperature sensor is shown in FIG. 10.

Figure 10:
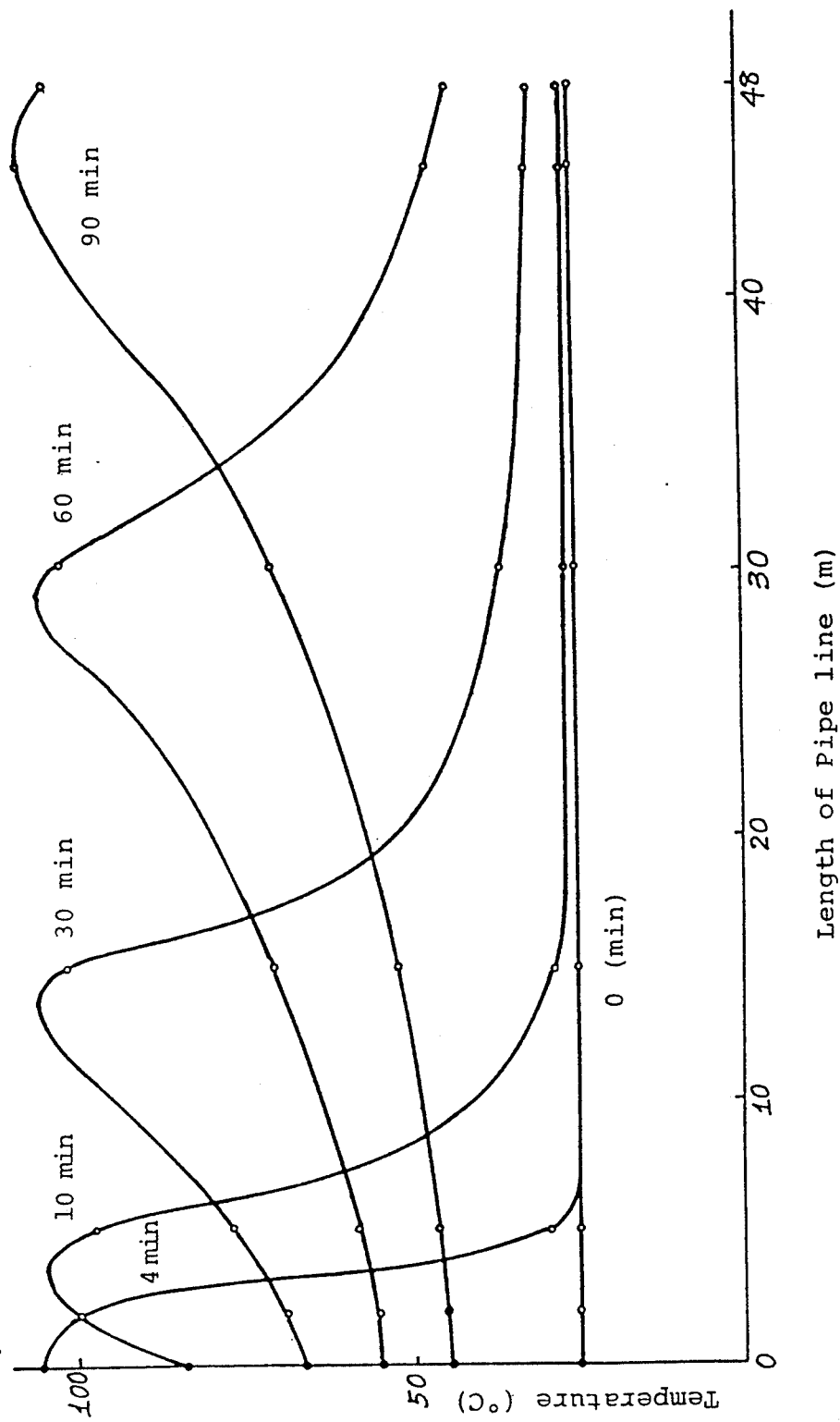
FIG. 10 is a graph showing the temperature of the lining material over time when it is heated according to the mode of this invention as shown in FIG. 8.

In view of FIG. 10, it is noted that the temperature of the lining material is scarcely elevated unless the nozzle approaches, but the temperature is elevated rapidly by superheated steam if the nozzle approaches. When the nozzle is passed, a temperature exceeding 100° C. is continued for about 6 minutes whereby SMC was entirely cured. As the sensor was set on the outer surface of the lining material and the heat was absorbed by the pipe line, the temperature measured was somewhat higher than 100° C., but the inner surface of the lining material was heated at a temperature nearly 200° C. on account of the heat of reaction.

After the nozzle was passed and the reaction for curing the SMC was finished, the temperature was dropped as the heat was absorbed by the pipe line. SMC was cured throughout the pipe line to form a rigid FRP as a whole by moving the nozzle from one end to the other end of the pipe line. The time required for this operation was about 90 minutes.

EXPERIMENTAL EXAMPLE 2

Figure 11:
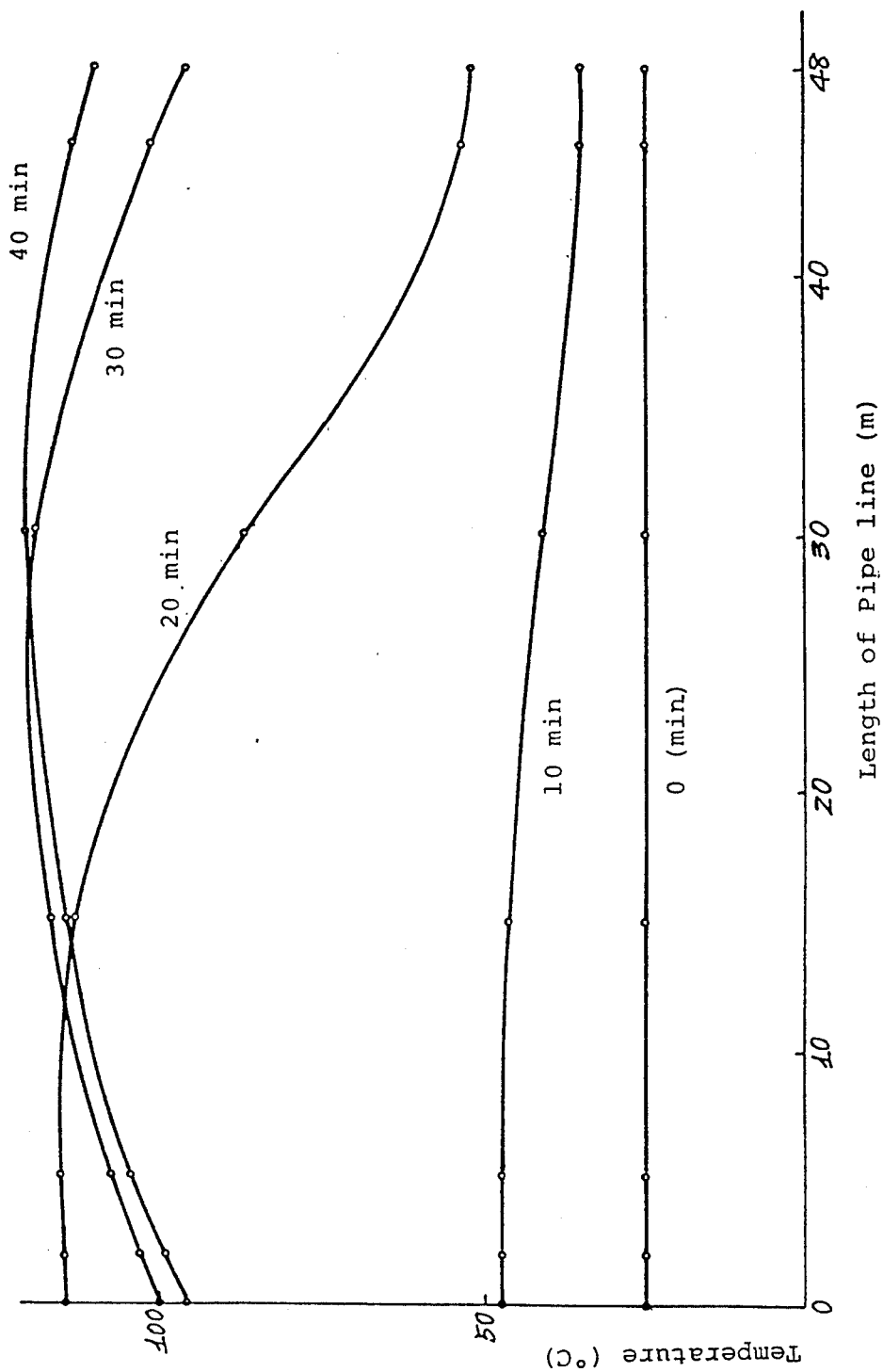
FIG. 11 is a graph showing the temperature of the lining material over time when it is heated according to another mode of this invention as shown in FIG. 8.

The same lining material provided with temperature sensors was inserted into the same pipe line as used in Experimental Example 1 and applied onto the inner surface thereof by introducing compressed air in the confined pipe line. Pressurized steam of 0.5 kg/cm$^2$ is then introduced from one end of the pipe line while gradually expelling the compressed air. In this manner, the compressed air in the lining material was replaced by pressurized steam. After the lapse of 10 minutes from then, the nozzle was initiated to move while jetting pressurized steam of 3 kg/cm$^2$ therefrom. The velocity of moving the nozzle was 2 m/min. The change in temperature in this case measured by the sensors is shown in FIG. 11.

As the lining material was subjected to a preliminary heating operation in this Experimental Example by sending pressurized steam of a low pressure, elevation of the temperature in case of jetting the pressurized steam from the nozzle was rapid. In addition, the superheated steam of low pressure was continuously introduced from one end of the pipe line. Accordingly, the curing reaction proceeded rapidly without absorption of the heat by the pipe line and the velocity for moving the nozzle could be increased to 34 minutes, whereby the temperature of the lining material exceeded 100° C. over the full length thereof and the SMC was completely cured after 5 minutes to form a rigid FRP pipe.

COMPARATIVE EXAMPLE

Figure 12:
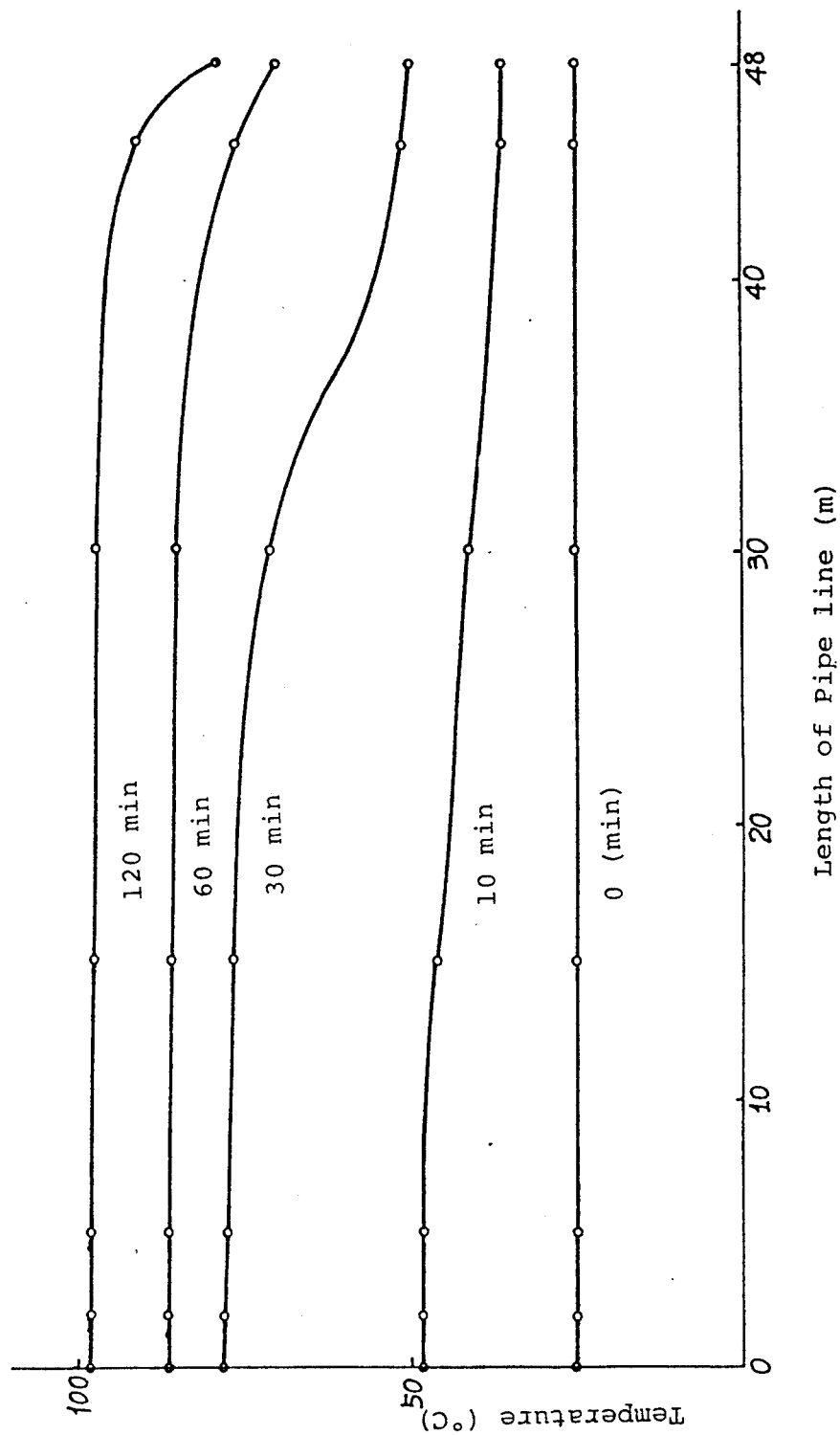
FIG. 12 is a graph showing the temperature of the lining material over time when it is heated according to a conventional process.

In the same manner as described in Experimental Example 1, the lining material provided with temperature sensors was introduced into the pipe line and inflated by introducing compressed air thereinto. Pressurized steam of 0.5 kg/cm2 was introduced from one end of the lining material while expelling the compressed air from the other end of the lining material, thereby replacing the compressed air by the pressurized steam. The pressure in the lining material was kept continuously whereby the change in temperature measured by the sensors is shown in FIG. 12.

In this Comparative Example wherein the lining material was heated by the pressurized steam of a low pressure introduced from one end thereof, the elevation of the temperature in the location where the steam was introduced was relatively rapid while that of the other end was very slow. It took about 60 minutes after the initiation of introducing the pressurized steam for the temperature exceed 70° C. over the full length of the lining material. As about 60 minutes were required for curing SMC completely at 70° C., it follows that about 120 minutes are required for completing the curing of SMC.

As has been described hitherto, the technical effects and advantages achieved by the lining material and the process of this invention are outstanding and so it is obvious that the lining material of this invention is particularly suitable for the repair and/or reinforcement of sewage pipe lines.

It is understood that the preceding representative embodiments may be varied within the scope of the present specification both as to materials and treatment conditions, by those skilled in the art to achieve essentially the same results.

As many widely, different embodiments of this invention may be made without departing from the spirit and scope thereof, it is to be construed that this invention is not limited to the specific embodiment thereof except as defined in the appended claims.

What is claimed is:

1. A lining material for pipe lines, comprising: a flexible tubular film; a resin-impregnated sheet covering an outer surface of said flexible tubular film; and a tubular covering material overlaid on an outer surface of said resin-impregnated sheet; said resin-impregnated sheet comprising a mat of fibers of a high tenacity, and optionally a fabric, impregnated with a thickened liquid thermohardenable resin to form a fiber-reinforced or fabric-fiber-reinforced composite molding sheet having a width greater than an inner circumferential length of a pipe line to be treater, lateral end portions of the molding sheet overlapping each other slidably in opposite directions so as to form a tube; said tubular covering material having a strong resistance to tensile force, said tubular covering material overlaying the outer surface of said molding sheet for a full length of said molding sheet.

2. The lining material according to claim 1, wherein said tubular covering material is selected from the group consisting of fabric-like and net-like tubular materials.

3. The lining material according to claim 2, wherein said tubular covering material is a fabric-like material coated on at least an outer surface thereof with a waterproof film.

4. The lining material according to any one of claims 1-3, wherein said resin-impregnated sheet comprises: a fabric layer; and a plurality of separated sheet fractions of said mat of fibers of high tenacity, said plurality of sheet fractions being positioned on said fabric layer in a lengthwise and/or lateral direction in such a manner that lengthwise and/or lateral direction in such a manner that lengthwise and/or lateral end portions of the individual separate sheet fractions are overlapped so a to be slidable over each other in opposite directions to form said composite molding sheet, both lateral end portions of the composite molding sheet being overlapped such that the composite molding sheet forms a tube, with the fabric layer constituting an outer surface thereof.

5. The lining material according to any one of claims 1-3, wherein (a) said flexible tubular film is expansive up to a circumferential length corresponding to a maximum inner diameter of a pipe line system comprising plural pipe lines of different diameters arranged in series, and is folded several times at a folding point where a width of folded film is equal to or smaller than a minimum inner diameter of the pipe line system, (b) said fiber-reinforced or fabric-fiber-reinforced composite molding sheet has a circumferential length somewhat larger than an inner circumferential length corresponding to the pipe line system having a maximum diameter, and (c) said tubular covering material having water resistance, a circumferential length of the lining material being equal to or smaller than an inner circumferential length of the pipe length system having a minimum diameter.

* * * * *